(12) United States Patent
Pich et al.

(10) Patent No.: US 8,322,911 B2
(45) Date of Patent: Dec. 4, 2012

(54) METHOD FOR PREPARING A DISPERSION OF WATER-SOLUBLE POLYMERS IN WATER

(75) Inventors: Rene Pich, Saint Etienne (FR); Philippe Jeronimo, Montrond les Bains (FR)

(73) Assignee: S.P.C.M. SA, Saint Etienne (FR)

( * ) Notice: Subject to any disclaimer, the term of this patent is extended or adjusted under 35 U.S.C. 154(b) by 0 days.

(21) Appl. No.: 13/456,446

(22) Filed: Apr. 26, 2012

(65) Prior Publication Data

US 2012/0208951 A1    Aug. 16, 2012

Related U.S. Application Data

(62) Division of application No. 12/249,352, filed on Oct. 10, 2008, now Pat. No. 8,186,871.

(60) Provisional application No. 60/982,250, filed on Oct. 24, 2007.

(30) Foreign Application Priority Data

Oct. 12, 2007 (FR) ...................... 07 58252

(51) Int. Cl.
*B01F 15/02* (2006.01)
(52) U.S. Cl. ..................... 366/183.1; 366/316; 366/317; 366/303; 241/21; 241/62
(58) Field of Classification Search ............ 366/183.1, 366/315, 316, 303, 304, 306, 317, 307; 241/62, 241/41, 242, 257.1, 260, 21, 46.06, 166
See application file for complete search history.

(56) References Cited

U.S. PATENT DOCUMENTS

| | | | |
|---|---|---|---|
| 4,203,556 | A | 5/1980 | Krysiak et al. |
| 4,529,794 | A | 7/1985 | Sortwell et al. |
| 4,603,156 | A | 7/1986 | Sortwell |
| 4,640,622 | A | 2/1987 | Sortwell |
| 4,778,280 | A | 10/1988 | Brazelton |
| 4,845,192 | A | 7/1989 | Sortwell et al. |
| 4,874,588 | A | 10/1989 | Sortwell et al. |
| 5,018,871 | A | 5/1991 | Brazelton et al. |
| 5,599,102 | A | 2/1997 | Hamada et al. |
| 6,045,070 | A | 4/2000 | Davenport |
| 2006/0028914 | A1 | 2/2006 | Phillippi et al. |

FOREIGN PATENT DOCUMENTS

| | | |
|---|---|---|
| DE | 2914302 A1 | 10/1980 |
| EP | 0238723 A | 9/1987 |

OTHER PUBLICATIONS

French Search Report for FR 0758252 dated Jun. 2, 2008.

*Primary Examiner* — Yogendra Gupta
*Assistant Examiner* — Ninh Le
(74) *Attorney, Agent, or Firm* — Heslin Rothenberg Farley & Mesiti P.C.

(57) ABSTRACT

A method for dispersing a water-soluble polymer includes: metering and prewetting polymer with primary water; grinding and draining of the dispersed polymer in a chamber comprising a rotor and a stator; and providing a ring with perforations fed by a secondary water circuit on all or part of the periphery of the chamber for spraying of pressurized water on the blades of the stator.

8 Claims, 1 Drawing Sheet

METHOD FOR PREPARING A DISPERSION OF WATER-SOLUBLE POLYMERS IN WATER

CROSS REFERENCE TO RELATED APPLICATIONS

This application is a divisional of U.S. application Ser. No. 12/249,352 filed on Oct. 10, 2008, which is now U.S. Pat. No. 8,186,871, and claims priority of French application No. 0758252 filed Oct. 12, 2007, and U.S. provisional application No. 60/982,250 filed Oct. 24, 2007, the full disclosures of which are hereby incorporated by reference herein.

BACKGROUND ART

The present invention relates to an installation for the wet grinding of water-soluble polymers to obtain their dispersions and then subsequently, their rapid dissolution in water. It also relates to a method implementing the device.

According to the invention, the polymer is put in suspension in the water by passing through a grinder comprising a rotor with knives rotating in a stator with very close blades; the plugging of this stator by the polymer gel formed being prevented by secondary water jets which disperse and dilute the polymer.

Among the water-soluble polymers belonging to the prior art, partially hydrolysed acrylamide polymers and their copolymers are particularly known, and also xanthan gums, cellulose derivatives and guar gums. These polymers develop a viscosity thanks to their molecular weight and/or the inter-chain ionic repulsions. The mechanism governing the viscosity is linked to a rise in hydrodynamic volume or to inter-chain repulsions.

Although acrylamide (co)polymers are usually available commercially in the form of powders, they are generally used in dilute aqueous solutions in industrial applications. This necessitates a step of dissolution of the polymer in the water in precise physical and chemical conditions.

However, even if these polymers are hydrophilic, their dissolution is difficult. Their dissolution varies, in particular, according to their composition and their molecular weight.

Thus, to be used in solution, powder polymers are first dispersed in water using wetting equipment. The main equipment used is of various types:
eductor with dry or wet feed hopper,
water/air disperser in which the polymer is transported by an air actuated system in a chamber where it is wet by spray nozzles,
various high speed stirrers.

The dispersion in water thereby obtained is then dissolved continuously or in batches by stirring.

The main drawback of these dispersion systems is that, the higher the molecular weight of the polymer, the higher the viscosity of the resulting solution. This has the consequence of limiting the polymer concentration in the water, generally from 1 to 5 grams/liter, and therefore requiring extremely large dissolution tanks for large scale industrial applications.

For example, for high molecular weight acrylamide (co) polymers (about 15 million), in powder form with an average particle size of 0 to 1 mm, at the temperature of 20° C., the dissolution time required to obtain a solution of 5 g/l is about:
4 hours for a nonionic polymer,
1 hour for an anionic polymer,
45 minutes for a cationic polymer.

To solve these problems of concentration, dispersion/dissolution and equipment cost/size, various methods have been developed. The main methods are listed below. They are based on two guidelines:—modification of the commercial form of the polymer (cf 1-5) and—improvement of the dissolution equipment (cf 6).

1/ Reduction of the Size of Particles with Standard Grain Size Distribution by Dry Grinding.

Acrylamide (co)polymers in solid (powder) form are mainly produced by gel polymerisation followed by steps of chopping, drying then grinding. It is well known to a person skilled in the art that a significant action on the grain size distribution of the powder (decrease) has the result of facilitating its hydration and hence its dissolution.

However, this solution has many limiting factors, that is:
high grinding cost: because the softening point is low (close to 50° C.) requiring the use of large grinders with large quantities of cooling air or the use of cryogenic systems,
a very dusty end product: since the product is used directly by the operators, it is difficult to control the rate of particles in the atmosphere without sophisticated equipment,
an increase in 'fisheyes': during their use, the fine polymeric particles tend to cake together on wetting by forming numerous 'fisheyes'. These are gelatinous particles ranging in size from a few millimeters to a few centimeters, and which only dissolve after several hours to several days. These aggregates tend to plug the lines, the metering pumps and the filters.

2/ Inverse Emulsion (Water-in-Oil) Polymerisation

In that well known process to a person skilled in the art, the monomers are emulsified by a hydrocarbon and polymerised in the presence of stabilising surfactants. To dissolve the polymer thus obtained, it is necessary to add an inverted surfactant (high HLB) either directly to the emulsion or during its dissolution. The end product therefore has a high concentration of detrimental surfactants and an organic phase, resulting in a significant additional cost of raw materials (30 to 60%), transport (30 to 40%) and storage. This means that the emulsions are widely used for low- or medium-consumption applications because of their ease of use, but are too expensive for large scale projects.

3/ Aqueous Dispersion Polymerisation (Also Called 'Water-in-Water Emulsion')

This technique consists in polymerising a monomer or a mixture of monomers in water containing a salt and/or other chemical agents in solution or in dispersion. The hydrophilic polymer formed during the polymerisation precipitates when it reaches a sufficiently high molecular weight. At the end of the polymerisation, a liquid dispersion of polymer particles in suspension in the aqueous mixture is recovered. The advantages of this technology are obvious. As to their manufacturing cost, this remains low, that is, similar to that of powder polymers, because the dispersion obtained comprises almost exclusively polymer, water and salts. Moreover, it has the same decisive advantage as the oil-in-water type emulsion, that is, very rapid solubilisation of the polymer in water.

These products nevertheless face several obstacles to their development:
a low concentration (15 to 20%) and hence extra cost for transport and storage,
limited polymer molecular weight,
reduced shelf life.

4/ Suspension Polymerisation

This polymerisation method consists in forming droplets of an aqueous solution of the monomer or monomers in suspension in an inert liquid which, after polymerisation by addition of a catalyst, yield polymers in the form of beads. At the end of polymerisation, the water is then removed during an azeotropic distillation step. The polymer beads are then filtered and dried. The azeotropic distillation step is generally considered as critical. With this method, the particle size (100 to 400 microns) can be reduced nearly uniformly without forming large quantities of fines.

Here also, this solution has many limiting factors, that is:
the polymeric particles formed by this method also have a strong tendency to form fisheyes above a certain concentration,
moreover, the major limit of this method is the inability to produce very high molecular weights through its use. The molecular weights of the resulting polymers are limited to 10-12 million, which is insufficient in many industries.

5/ Placing the Powder in Suspension in Surfactants

The finely ground polymer powder can be placed in suspension either in a hydrocarbon containing large quantities of surfactants, or directly in pure surfactants. These suspensions are rapidly dissolved but are unstable and have the same economic drawbacks as reverse emulsions.

6/ Wet Grinding of Polymer Powder Having a Standard Grain Size Distribution

The standard grain size distribution polymer is placed in suspension in the water and then ground. To do this, documents U.S. Pat. No. 4,845,192, U.S. Pat. No. 4,877,588 and U.S. Pat. No. 4,529,794 describe a device comprising a closed cage equipped with fixed and moving knives (mounted on a rotor) and positioned at a spacing of 50 to 500 microns, with a clearance of 50 to 500 microns, which cut the product into very small particles, typically smaller than 200 microns. This apparatus is manufactured by URSCHEL under the trade name Comitrol. The Comitrol 1500 has a cutting diameter of 200 mm.

According to this method, it is the cutting dimension that determines the final dissolution time. Hence this method, which provides a significant improvement in dissolution time of water-soluble polymers after dispersion in the device appears to be advantageous. However, it has many major drawbacks:
the spacing of the knives and their angle is critical for obtaining a satisfactory cutting,
the speed required for satisfactory operation is very high: 10 000 to 13 000 rpm (e.g.: Comitrol 1500 apparatus equipped with an 8-inch rotor). At lower speed of rotation of the rotor, the system is blocked by plugging of the interval between the fixed knives: no dissolution is then possible,
the wear of the fixed and mobile knives is extremely rapid. On average, after continuous in-line use, it has been found that the knives had to be replaced every 10 to 90 days. This has the consequence of requiring the doubling of the number of grinding apparatus necessary and requiring difficult and lengthy maintenance due to the replacement of about 200 knives in very precise conditions and often beyond the scope of local maintenance personnel. This aging also occurs when using high strength materials,
furthermore, at these speeds, rapid aging and overheating of the bearings are observed, making this apparatus incompatible with ATEX standards (relative to workplace equipment safety). Ceramic bearings could diminish the problem without solving it,
finally, the installed motor capacities are extremely high, for example 30 kW for a Comitrol 1500.

Due to these drawbacks which appear prohibitive, in 20 years, the use of this type of apparatus for dispersing water-soluble polymers has not spread.

The invention overcomes all the above mentioned drawbacks.

BRIEF DESCRIPTION OF THE INVENTION

According to the invention, it has been found surprisingly that it is possible to disperse water-soluble polymers in water using a wet grinding unit rotating at industrial speed, about 20 to 40 m/s peripheral speed (with an average speed of 3000 rpm for a rotor diameter of 200 mm), and having a high flow rate (for example, 300 kg/h for a grinder equipped with a 200 mm diameter rotor), by prewetted the standard grain size polymer with a first volume of water, and then chopping it immediately, before dispersing it by the addition of a second volume of water.

The subject of the invention is a device for dispersing a water-soluble polymer having a standard grain size distribution of between 0.15 and 1 mm comprising:
a wetting cone in which the polymer is metered, usually using a metering screw, the said cone being connected to a primary water inlet circuit,
at the bottom end of the cone:
a chamber for grinding and draining of the dispersed polymer comprising:
a rotor driven by a motor and equipped with knives optionally tilted with respect to the radius of the rotor,
a fixed stator consisting of blades optionally tilted with respect to the radius of the rotor and uniformly spaced,
the rotor/stator assembly for wet grinding the polymer,
on all or part of the periphery of the chamber, a ring fed by a secondary water circuit, the ring communicating with the chamber for the spraying of pressurised water on the blades of the stator and thereby releasing the ground and swollen polymer on the surface of the said blades,
the assembly serving to reduce the speed of rotation and increase the concentration of the dispersion at the outlet of the grinding chamber.

According to a first feature, the polymer is wet in the cone by overflow, the cone being equipped in this case with a double jacket at the base of which the primary water inlet circuit is connected. Alternately, this wetting can also take place in a cone by any other means well known to a person skilled in the art, for example spray nozzles or a flat jet.

In practice, the rotor is equipped with 2 to 20 knives, advantageously between 4 and 12. However, depending on the rotor diameter, the number of knives may vary. Similarly, the number of blades of the stator is variable according to the diameter thereof. In practice, it is between 50 and 300, advantageously between 90 and 200 for a rotor diameter of 200 mm. Moreover, and according to another feature, the knives are optionally more or less tilted with respect to the radius of the rotor. Advantageously, this tilt is between 0 and 15°, preferably between 2 and 10°.

According to another feature, the distance between the blades of the stator is between 50 and 800 microns. For effective grinding, the distance between the knives of the rotor and the blades of the stator is between 50 and 300 microns, advantageously between 100 and 200 microns, in practice about 100 microns. Advantageously, the blades of the stator are tilted at an angle smaller than 10° with respect to the radius of the rotor. These blades are either assembled in a casing, or cut in the mass of a metal or of a high strength compound.

In one advantageous embodiment, the rotor knives are not tilted, while the stator blades are tilted.

Furthermore, concerning the peripheral ring, it communicates with the grinding and draining chamber via perforations in the form of holes, slits or equivalent, whereof the size and distribution on the ring are such that the secondary water can be propelled on the blades of the stator at a pressure serving to prevent the clogging by the gelled polymer, of the spaces between the blades. Accordingly, the pressure applied by the rotor pump effect can be sharply decreased without a risk of plugging. The smaller the spacing of the blades, the higher the pressure required for continuous operation.

A further subject of the invention is a method for dispersing a water-soluble polymer, particularly acrylamide and/or methacrylamide (co)polymer using the abovementioned device.

Practically, the molecular weight of the polymer is of at least 10 millions, advantageously more that 15 M.

According to this method, continuously or in batches:
- the polymer is prewetted in the wetting cone by a quantity of primary water suitable for obtaining a polymer suspension having a concentration of 15 to 100 g/l, advantageously 20 to 80 g/l,
- then, instantaneously, in the grinding and draining chamber, the size of the prewetted polymer is reduced, in practice to a size of 50 to 200 microns by chopping the polymer between the knives of the rotor and the blades of the stator, without degradation of the molecular weight of the polymer,
- then, the pressurised secondary water from the peripheral ring is used to clear the interstices between the blades of the stator in which the swollen polymer is liable to be fixed,
- the dispersed polymer is removed, having, by dilution with the secondary water, a concentration of between 3 and 30 g/liter, advantageously between 10 and 25 g/l.

According to an essential feature, the conformation of the device, in providing for a wetting step by a first volume of water leading to a dispersion of the polymer followed by a step of dilution of the dispersed polymer, with a second volume of water allows to considerably reduce the speed of rotation of the rotor.

Advantageously, the primary water represents between 20 to 40% by weight of the total water (primary water+secondary water) whereas secondary water represents between 60 to 80% of the total water (primary water+secondary water) which is required for obtaining a polymer concentration of between 3 and 30 g/liter.

Thus and according to one feature of the method, the speed of rotation of the rotor is between 2000 and 5000 rpm, on average about 3000 rpm for a cutting diameter of 200 mm. It is between 3000 and 6000 rpm for a cutting diameter of 10 cm and between 1500 and 3000 rpm for a cutting diameter of 40 cm. More generally, according to the diameter of the rotor also referred to as cutting diameter, the rotor speed is between 20 and 40 m/s instead of 90 to 150 m/s for a Comitrol 1500 apparatus.

Furthermore, to avoid plugging the space between the stator blades by the ground polymer, the secondary water is propelled through the perforations of the ring at a pressure of at least 1 bar, usually at the main water pressure, that is 3 to 6 bar or more, for very fine intervals, in general between 1 and 10 bar.

As already stated, it is essential, in the present invention, to prewetted the polymer before its chopping in proportions of between 20 and 40% of the total quantity of water required for its dilution at a concentration of between 3 and 30 g/liter. This allows to sharply increase the flowrate of the apparatus, which can be up to 300 kg of polymer per hour for a cutting diameter of 200 mm, by dividing the method into two steps: prewetted followed by final dilution during grinding.

In view of these conditions of implementation, there is no specific requirement associated with the wear of the device, the maintenance period of the grinding unit being longer than one year and typically three years.

The grinding unit of the invention can be applicable to all products with standard grain size distribution having a substantial hydrophilic character such as: cellulose salt or ether, xanthan gum, guar gum, etc.

BRIEF DESCRIPTION OF THE DRAWING FIGURES

The invention and its advantages appear clearly from the following examples, in conjunction with the figures appended hereto.

DETAIL DESCRIPTION

Example 1

The Device

Figure 1:
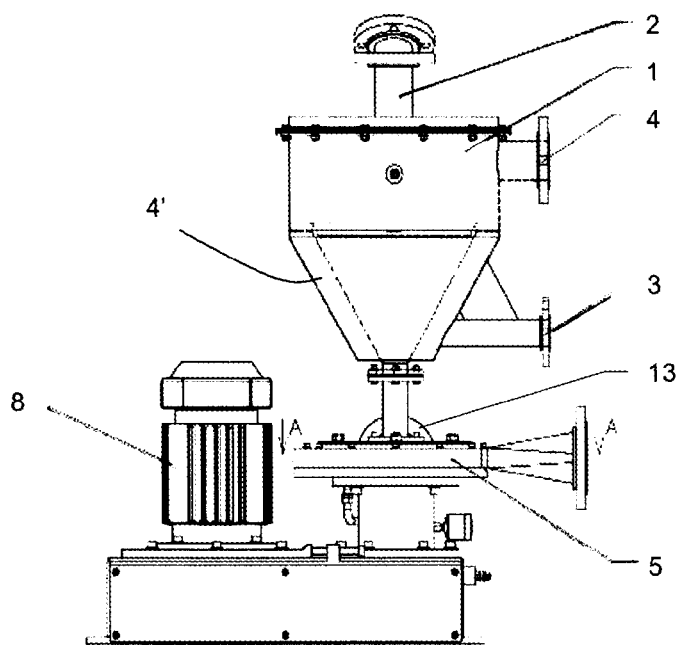
FIG. 1 is a schematic side view of the device of the invention.
Figure 2:
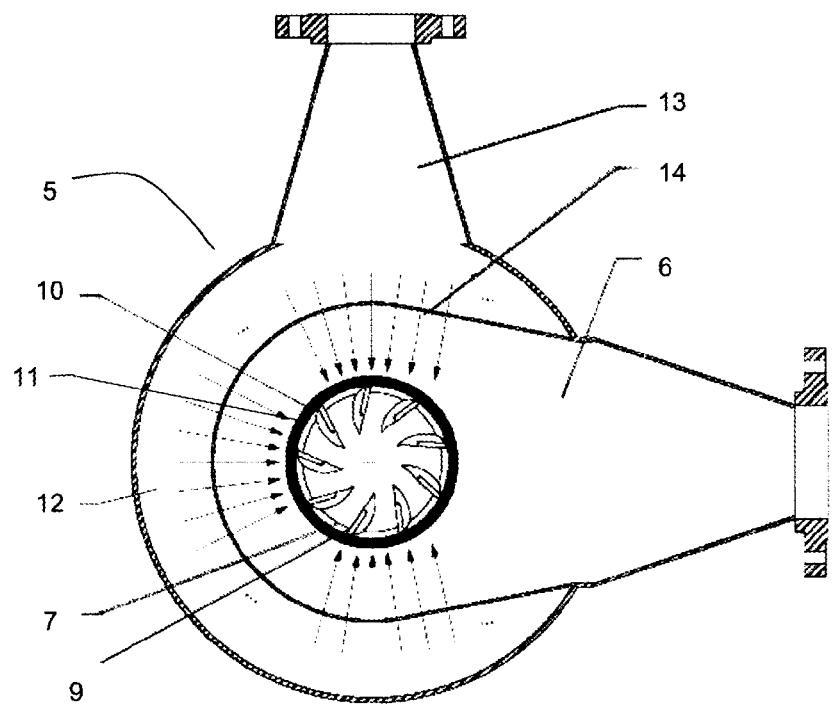
FIG. 2 is a cross-section along AA'.

According to FIG. 1, the device of the invention comprises:
- a wetting cone (1) connected at its apex to a column (2) batching the standard grain size distribution polymer, usually via a metering screw, the cone (1) being connected at its bottom to a primary water inlet circuit (3) which feeds an overflow (4, 4'),
- at the bottom end of the cone, an assembly (5) comprising:
  - a chamber (6) for grinding and draining of the dispersed polymer (FIG. 2) comprising:
    - a rotor (7) driven by a motor (8) fitted with knives (9),
    - a fixed stator (10) comprising blades (11) uniformly spaced and slightly tilted with respect to the radius of the rotor,
  - on all or part of the periphery of the chamber, a ring (12) fed by a secondary water circuit (13), the ring (12) communicating with the chamber (6) via slits (14) for spraying pressurised water on the blades (11) of the stator (10).

Example 2

Application

Three grinding units according to the invention having different sizes were tested in this example.

The technical features and dissolution conditions are given in the table below using an acrylamide/sodium acrylate copolymer having a molecular weight of 19 million and grain size distribution of 0-1000 microns.

|  | Test 1 'PSU 300' | Test 2 'PSU 100' | Test 3 'PSU 1000' |
|---|---|---|---|
| Technical features of the grinding unit | | | |
| Cutting diameter in mm (rotor size) | 200 | 100 | 400 |
| Number of fixed knives | 90 | 50 | 200 |
| Height of fixed knives in mm | 16.6 | 16.6 | 33.2 |
| Spacing between knives | 300 microns | 200 microns | 400 microns |
| Spacing between fixed/mobile knives | 100 microns | 100 microns | 100 microns |
| Cutting angle | 3° | 2° | 3° |
| Number of mobile knives (i.e.: on the rotor) | 6 | 4 | 12 |
| Rotor speed | 3000 rpm | 5000 rpm | 2000 rpm |
| Rotor power | 7.5 kW | 3 kW | 20 kW |
| Dispersion characteristics | | | |
| Primary water flow rate | 10 m3/h 25° C. | 3 m3/h 25° C. | 20 m3/h 25° C. |
| Anionic polyacrylamide flow rate (anionicity 30%; molecular weight 19 million; grain size distribution 0-1000 microns) | 300 kg/h | 110 kg/h | 1400 kg/h |
| Secondary water flow rate in the concentric ring surrounding the stator (pressure 4 bar) | 20 m3/h 25° C. | 8 m3/h 25° C. | 40 m3/h 25° C. |
| Final concentration of dispersion | 10 gr/l | 10 gr/l | 23.3 gr/l |
| Final pressure | 1.5 bar | 1 bar | 1.8 bar |
| Dissolution time to obtain the usual maximum viscosity | <10 min | <5 min | <5 min |

As may be observed, the grinding unit of the invention allows to:
- obtain very short dissolution times at high concentration even for very high molecular weight polymers, without the formation of fisheyes and requiring no subsequent filtration,
- deliver these dispersions under pressure, which allows to transport them to the end use; if necessary, the grinding units can also be connected directly to a positive displacement pump of the same capacity (Moyno, gear, lobe, screw, type etc.) for longer distances,
- operate continuously over very long periods without damage to the drive bearings, nor to the rotor or the stator, the temperature of the ball bearings only rising by a few degrees (5 to 10° C.) and then being stabilised,
- and constructing apparatus of different sizes and therefore adaptable to the demand while maintaining normal industrial speeds (contrary, for example, to the URSCHEL equipment which, in case of a small unit similar to the 'PSU 100' would demand the use of excessively high speeds of about 20000 to 30000 rpm).

The invention claimed is:

1. Method for dispersing a water-soluble polymer having a standard grain size distribution of between 0.15 and 1 mm, comprising: metering and prewetting polymer with primary water in a wetting cone connected to a primary water inlet circuit; grinding and draining dispersed polymer in a chamber located at a bottom end of the cone, the chamber including a rotor driven by a motor and equipped with knives, and a fixed stator having blades; providing a peripheral ring fed with secondary water by a secondary water circuit on all or part of a periphery of the chamber surrounding the stator; and propelling pressurized secondary water through perforations in the ring onto the blades of the stator and thereby releasing ground and swollen polymer on a surface of said blades.

2. Method according to claim 1, wherein, in continuous or batch mode: the polymer is prewetted in the wetting cone by a quantity of primary water suitable for obtaining a polymer suspension having a concentration of 15 to 100 g/L, then, instantaneously, in the grinding and draining chamber, size of the prewetted polymer is reduced by chopping the polymer between the knives of the rotor and the blades of the stator, then, the pressurized secondary water from the peripheral ring is used to clear interstices between the blades of the stator in which the swollen polymer is liable to be fixed, thereby removing the ground and swollen polymer, and wherein the primary water and the secondary water are diluted to obtain a total water, so as to achieve a polymer concentration of between 3 and 30 g/L.

3. Method according to claim 2, the concentration by dilution with the secondary water is between 10 and 25 g/l.

4. Method according to claim 2, wherein the primary water represents between 20 to 40% by weight of total water and the secondary water represents between 60 to 80% of the total water.

5. Method according to claim 2, wherein peripheral speed of rotation of the rotor is between 20 and 40 m/s.

6. Method according to claim 2, wherein the secondary water is propelled under a pressure of between 1 and 10 bar.

7. Method according to claim 6, wherein the secondary water is propelled under a pressure of between 3 and 6 bar.

8. Method according to claim 2, wherein the water-soluble polymer comprises a (co)polymer of acrylamide and/or methacrylamide.

* * * * *